United States Patent
Steffens, Jr. et al.

(10) Patent No.: US 6,305,711 B1
(45) Date of Patent: Oct. 23, 2001

(54) VEHICLE SAFETY APPARATUS INCLUDING MOVABLE INFLATABLE OCCUPANT PROTECTION DEVICE

(75) Inventors: Charles E. Steffens, Jr., Washington; John G. Bauer, Troy; John M. Seybold, Utica, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/433,492

(22) Filed: Nov. 3, 1999

(51) Int. Cl.$^7$ .............................. B60R 21/32; B62D 1/18
(52) U.S. Cl. .................... 280/777; 280/731; 280/732; 280/735
(58) Field of Search ................................ 280/777, 728.2, 280/731, 732, 735

(56) References Cited

U.S. PATENT DOCUMENTS

| | | |
|---|---|---|
| 3,481,626 | 12/1969 | Fergle . |
| 3,988,027 | 10/1976 | Serizawa et al. . |
| 4,968,058 | 11/1990 | Jones . |
| 4,989,898 | 2/1991 | Yamaguchi et al. . |
| 5,295,712 | * 3/1994 | Omura ................................ 280/777 |
| 5,695,214 | 12/1997 | Faigle et al. . |
| 5,826,901 | * 10/1998 | Adomeit ............................ 280/728.2 |
| 6,095,549 | * 8/2000 | Adomeit et al. .................. 280/728.2 |

* cited by examiner

Primary Examiner—Peter C. English
(74) Attorney, Agent, or Firm—Tarolli, Sundheim, Covell, Tummino & Szabo L.L.P.

(57) ABSTRACT

A vehicle safety apparatus (10) includes a vehicle steering column (40) connected to a vehicle steering wheel (42) to turn rotatable steerable vehicle wheels. A module (32) has an inflatable device (34) for helping to protect an occupant (36) of a vehicle (11) and an inflator (30) is connected with the inflatable device to provide inflation fluid for inflating the inflatable device. The apparatus (10) also includes at least one actuatable fastener (20) connected between the steering column (40) and a vehicle part (52). The actuatable fastener (20) has an unactuated condition blocking movement of the steering column (40) in a forward direction (58) in the vehicle (11) relative to the vehicle part (52). The actuatable fastener (20) has an actuated condition releasing the steering column (40) for movement in the vehicle (11) relative to the vehicle part (52) under load applied to the inflatable device (34) by the vehicle occupant (36). The forward movement of the steering column (40) effects forward movement of the inflatable device (34). The actuatable fastener (20) is preferably a pyrotechnic fastener.

21 Claims, 3 Drawing Sheets

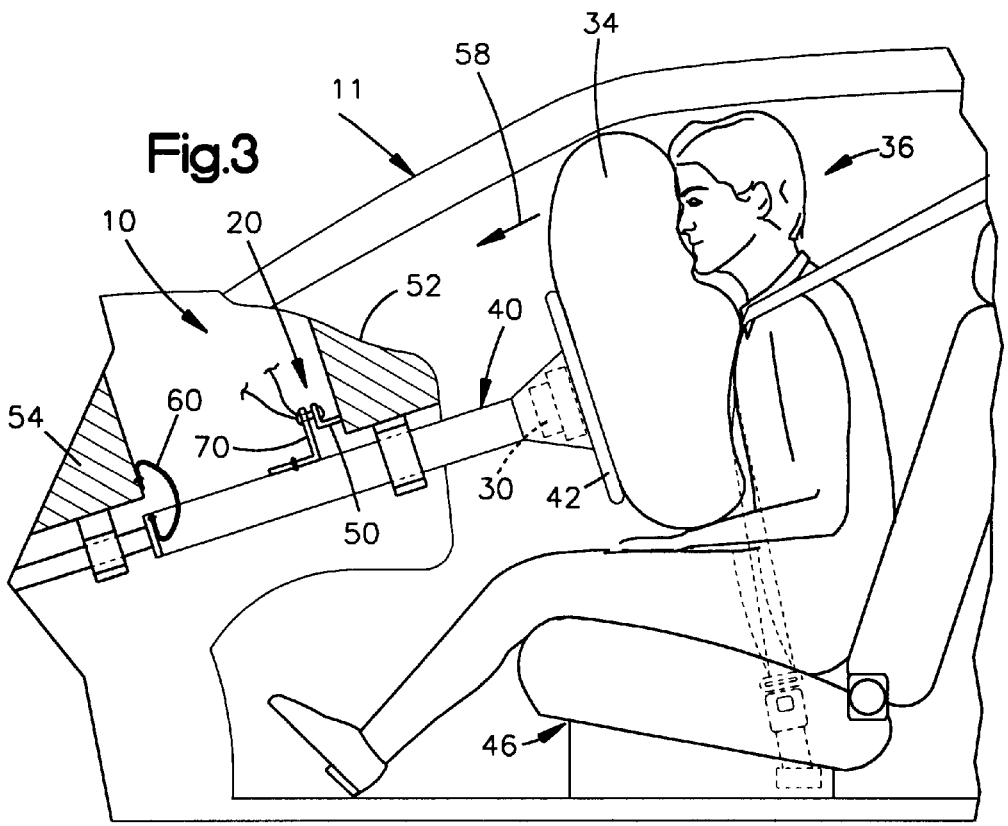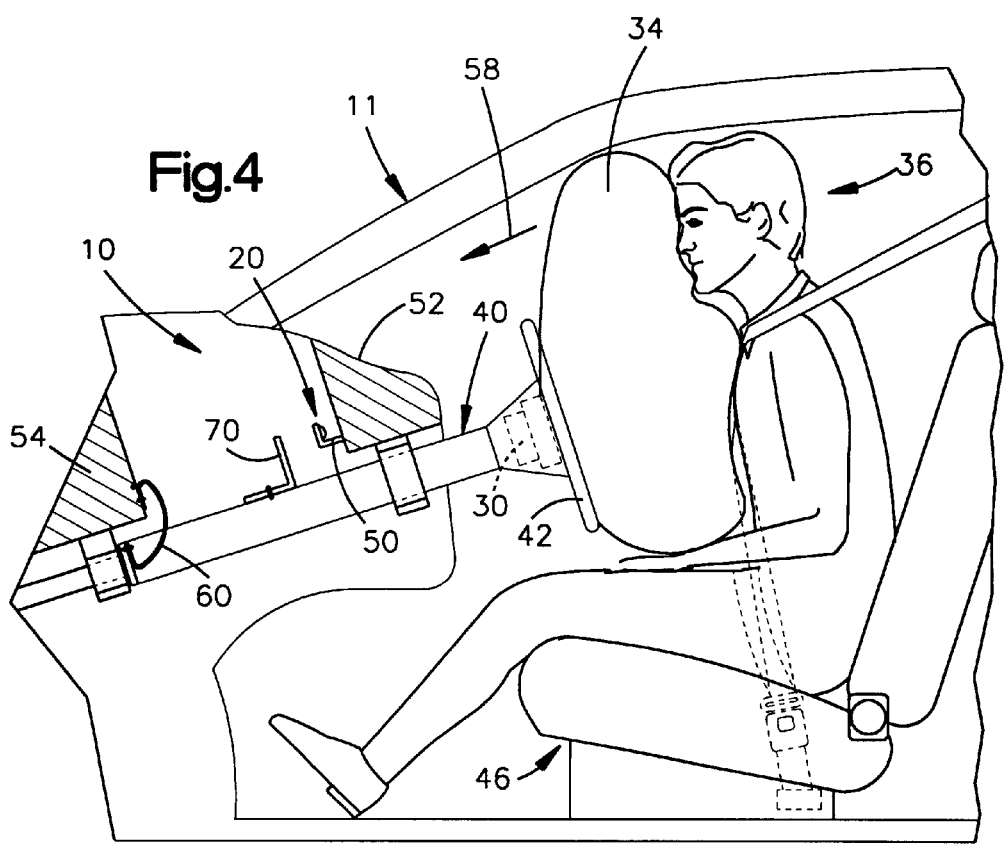

VEHICLE SAFETY APPARATUS INCLUDING MOVABLE INFLATABLE OCCUPANT PROTECTION DEVICE

BACKGROUND OF THE INVENTION

1. Technical Field

The present invention relates to a vehicle safety apparatus and, in particular, to an apparatus for reducing the load on a vehicle occupant arising from contact with an inflating air bag.

2. Description of the Prior Art

It is known to provide an energy absorbing structure in a vehicle steering column. If, in the event of a vehicle collision, the driver contacts the steering wheel with sufficient force, the steering column telescopes, or "strokes", to reduce the load on the driver. If the steering column supports a driver's side air bag, the steering column can telescope under force applied by the driver to the inflated air bag.

U.S. Pat. No. 3,988,027 describes a vehicle driver protecting steering arrangement including one or more explosive bolts supporting the steering column. In the event of a vehicle collision, the explosive bolts are actuated to release the steering column. The steering column is released to pivot downward, under the force of gravity, in an attempt to move the steering wheel out of the path of forward movement of the occupant's head and chest.

SUMMARY OF THE INVENTION

The present invention relates to a vehicle safety apparatus comprising a vehicle steering column connected to a vehicle steering wheel to turn rotatable steerable vehicle wheels. A module is operatively associated with the steering wheel and includes an inflatable device for helping to protect an occupant of a vehicle. An inflator is connected with the inflatable device to provide inflation fluid for inflating the inflatable device. The apparatus also includes at least one actuatable fastener connected between the steering column and a vehicle part. The actuatable fastener has an unactuated condition blocking movement of the steering column in a forward direction in the vehicle relative to the vehicle part. The actuatable fastener has an actuated condition releasing the steering column for movement in the vehicle relative to the vehicle part under load applied to the inflatable device by the vehicle occupant. The forward movement of the steering column effects forward movement of the inflatable device. The actuatable fastener is preferably a pyrotechnic fastener.

The present invention also relates to a vehicle safety apparatus comprising a vehicle steering column connected to a vehicle steering wheel to turn rotatable steerable vehicle wheels. An inflatable device has a folded, uninflated condition and an unfolded, inflated condition for helping to protect an occupant of a vehicle. A vehicle part is spaced apart from the vehicle steering wheel. A housing is mounted to the vehicle part and contains the inflatable device. At least one actuatable fastener fastens the housing to the vehicle part. The actuatable fastener has an unactuated condition securing the housing to the vehicle part and blocking movement of the housing in a forward direction in the vehicle relative to the vehicle part. The actuatable fastener comprises a pyrotechnic rivet. The actuatable fastener has an actuated condition releasing the housing for movement in the forward direction in the vehicle relative to the vehicle part under load applied to the inflatable device by the vehicle occupant. The forward movement of the housing enables forward movement of the inflatable device.

BRIEF DESCRIPTION OF THE DRAWINGS

Further features of the present invention will become apparent to those skilled in the art to which the present invention relates from reading the following specification with reference to the accompanying drawings, in which:

FIG. 3 is a view similar to FIG. 2 showing the vehicle occupant loading the inflated air bag and the fastener still in the unactuated condition;

FIG. 4 is a view similar to FIG. 3 showing the fastener in an actuated condition;

DESCRIPTION OF PREFERRED EMBODIMENTS

The present invention relates to a vehicle safety apparatus and, in particular, to an apparatus for reducing the load on a vehicle occupant arising from contact with an inflating air bag. The present invention is applicable to various safety apparatus constructions. As representative of the present invention, FIGS. 1–4 illustrate a vehicle safety apparatus 10 that is a first embodiment of the invention and that is part of a vehicle 11.

The safety apparatus 10 includes one or more vehicle condition sensors indicated schematically at 12. The vehicle condition sensors 12 are known devices operative to sense vehicle conditions such as crash severity, sudden vehicle deceleration, an impact to the vehicle 11, or a rollover condition of the vehicle. The safety apparatus 10 also includes one or more occupant condition sensors indicated schematically at 14. The occupant condition sensors 14 are known devices operative to sense occupant conditions such as seat belt usage, size, weight, and/or position of the vehicle occupant.

Figure 1:
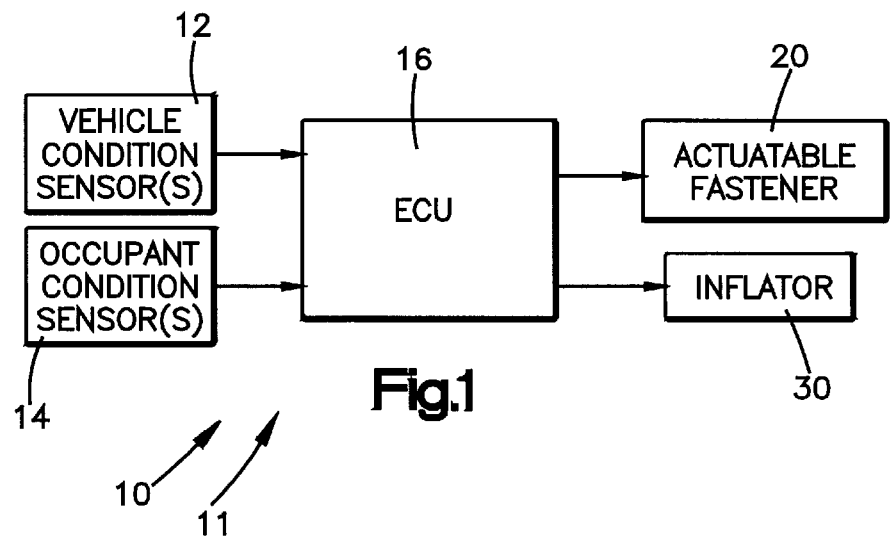
FIG. 1 is a functional block diagram of a vehicle safety apparatus in accordance with the present invention.
Figure 2:
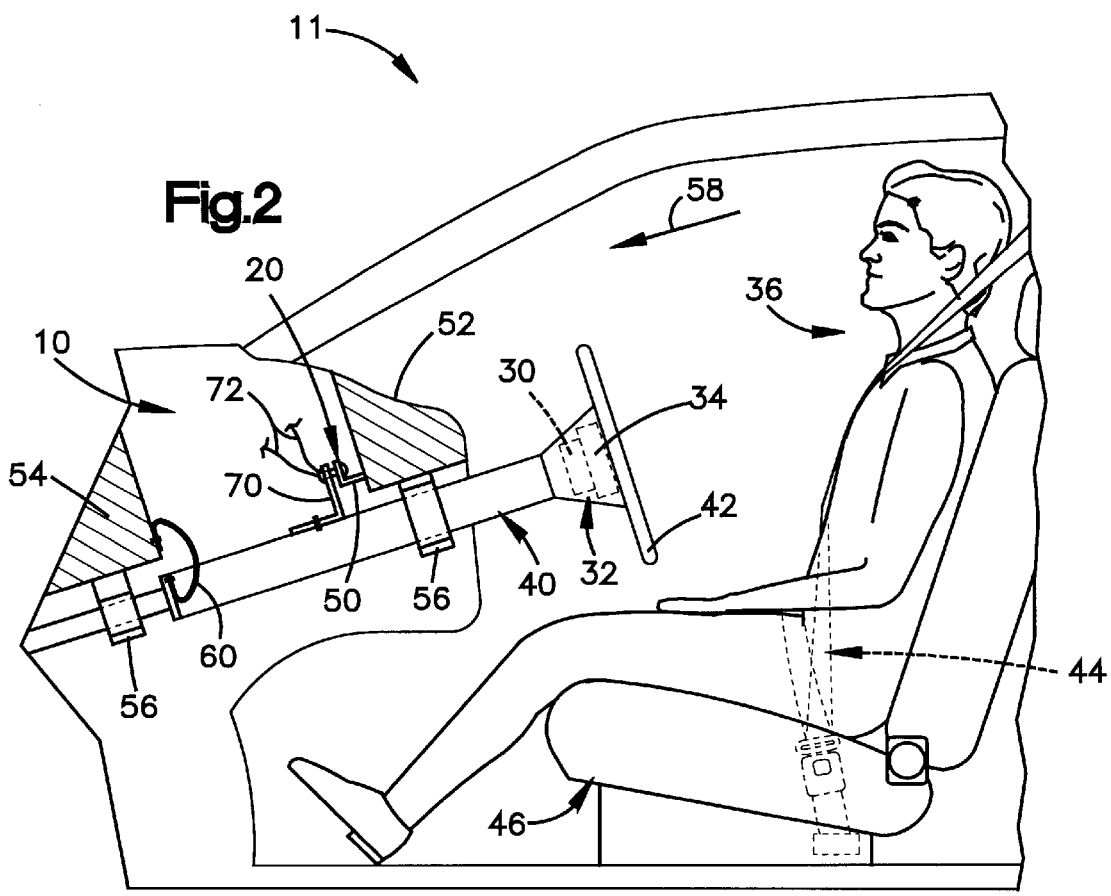
FIG. 2 is a schematic side view of a portion of the safety apparatus of FIG. 1 including an air bag module and support structure including an actuatable fastener, the fastener being shown in an unactuated condition.

The safety apparatus 10 includes programmable vehicle electric circuitry including at least one electronic control unit (ECU) indicated schematically at 16. The ECU 16 is operative to receive and act on the output signals from the vehicle condition sensors 12 and the occupant condition sensors 14. Based on the output from the sensors 12 and 14, the ECU 16 is operable, in a manner described below, to actuate an actuatable fastener 20 that is included in the safety apparatus 10. The ECU 16 is also operable, in a known manner and on the basis of the outputs of the sensors 12 and 14, to actuate an inflator indicated schematically at 30. The inflator 30 is shown in FIG. 2 as being part of a driver's side air bag module 32. The module 32 includes an inflatable device in the form of an air bag 34 for, when inflated, helping to protect a driver 36 of the vehicle 11. The air bag 34 is actuatable from a folded condition (FIG. 2) to an unfolded condition (FIGS. 3 and 4).

The vehicle 11 includes a driver's seat 46 and a seat belt system 44 for helping to protect the driver 36. The vehicle 11 also includes a steering column 40 that supports a vehicle steering wheel 42. The steering wheel 42 is used to turn rotatable steerable vehicle wheels (not shown). The air bag module 32 is mounted on the steering wheel 42, in a known manner. The steering column 40 is of a known type that telescopes or collapses if, in the event of a vehicle collision, the driver 36 moves forward in the vehicle 11 and applies a sufficient load on the steering wheel 42 or the air bag 34 (when inflated).

The steering column 40 is supported in the vehicle 11 by one or more vehicle parts including a column support bracket 50 on the vehicle instrument panel 52, and a bend strap support shown schematically at 54. The vehicle 11 also includes known column support structure, indicated schematically at 56, for limiting movement of the steering column 40 to movement in only a generally forward direction 58 in the vehicle.

The actuatable fastener 20 is preferably a pyrotechnic fastener in the form of a pyrotechnic rivet. The pyrotechnic rivet 20 is connected between the steering column support bracket 50 and a connector bracket 70 fixed to the steering column 40. Lead wires 72 extend from the pyrotechnic rivet 20 and are connected with the vehicle electric circuitry including the ECU 16.

The pyrotechnic rivet 20 is a known device that is electrically actuatable by a signal received over the lead wires 72. The pyrotechnic rivet 20, when unactuated, rigidly connects the connector bracket 70, and thereby the steering column 40, to the steering column support bracket 50. Upon actuation, the pyrotechnic rivet 20 fractures, enabling movement of the connector bracket 70, and thereby the steering column 40, relative to the steering column support bracket 50. The pyrotechnic rivet 20 is shown in an unactuated condition in FIGS. 2 and 3 and in an actuated condition in FIG. 4.

The vehicle 11 also includes one or more bend straps shown schematically at 60. The bend straps 60 are connected between the steering column 40 and the bend strap support 54. The bend straps 60 are known, plastically deformable flexible devices for resisting movement of the steering column 40 in the forward direction 58 in the vehicle 11 and are used to absorb energy. The bend straps 60 determine the amount of force that is necessary to move the steering column 40 forward in the vehicle 11 when the steering column is released for movement in the forward direction 58. There are many other types of energy absorbing column arrangements known in the art, such as collapsing tubes, crush members, and the like. Any of these devices could be used with the present invention.

In the event of a vehicle collision or rollover, or other event for which protection of the vehicle driver 36 may be desired, the sensors 12 and 14 provide appropriate output signals that are inputs to the ECU 16. Based on the output signals, the ECU 16 determines whether the inflator 30 should be actuated and, if so, when. If the ECU 16 determines that the inflator 30 should be actuated, an actuation signal is sent by the ECU to the inflator. The inflator 30 is actuated and causes the air bag 34 to inflate, as shown in FIG. 3, into a position between the driver 36 and the steering wheel 42.

As the air bag 34 inflates and the driver 36 moves forward in the vehicle 11 because of the driver's momentum, the driver contacts the inflating air bag (FIG. 3). The energy from the driver's forward movement is transmitted into the air bag 34 and thereby into the steering column 40.

The ECU 16, during this time period, also determines whether to actuate the pyrotechnic rivet 20. Actuating the pyrotechnic rivet 20 will release the steering column 40 for forward movement in the vehicle 11, under the load applied by the driver 36, so as to limit the maximum effective load on the driver. Specifically, the ECU 16 compares the outputs of the various vehicle condition sensors 12 and occupant condition sensors 14 with outputs found in a look-up table, for example. Depending on the outcome of this comparison, ECU determines whether or not to allow the air bag 34 to move forward in the vehicle 11. If the ECU 16 determines that it is desirable to allow the air bag 34 to move forward in the vehicle 11 under the load applied by the driver 36, the ECU sends an actuation signal over the lead wires 72 to the pyrotechnic rivet 20.

The pyrotechnic rivet 20 (FIG. 3) is actuated and fractures. The connector bracket 70, the steering column 40, and the air bag 34 are thus released for movement in the forward direction 58 in the vehicle 11. When the load applied to the steering column 40 by the forward moving driver 36 exceeds the resistance of the bend straps 60, the bend straps undergo plastic deformation. The steering column 40 moves forward in the vehicle 11 relative to the column support bracket 50 and the bend strap support 54. The forward movement of the steering column 40 causes the air bag 34 also to move in the forward direction 58 in the vehicle 11. The column support structure 56 guides the forward movement of the steering column 40, and limits it to movement only in the forward direction 58 in the vehicle 11. When the air bag 34 moves forward in the vehicle 11, it presents less resistance to forward movement of the driver 36, and so the maximum effective load on the driver is limited.

The present invention provides the ability to select the time at which the steering column 40 is released for forward movement in the vehicle 11. For example, the pyrotechnic fastener 20 can be actuated at a relatively early time during the inflation of the air bag 34. Thus, the actuatable fastener 20 could be released at the same time the inflator 30 is actuated, if a determination based on the outputs of the occupant position sensors 14 indicates that to be desirable. Alternatively, the ECU 16 may take additional time to analyze the vehicle event in order to determine whether the pyrotechnic fastener 20 should be actuated, making the determination on the basis of information arriving at the ECU after the vehicle collision or rollover is first sensed and the inflator 30 is actuated. This would prevent stroking of the steering column 40 early in a crash event, allowing the air bag 34 to apply early restraining forces to the vehicle occupant. At a later point in the event, when the vehicle crash pulse is near its highest severity, the steering column 40 is released, thus clipping the peak forces of the air bag 34 during the most aggressive part of the crash event. The vehicle electric circuitry can also be programmed not to actuate the pyrotechnic fastener 20 under some circumstances.

It should be understood that the present invention is applicable to other types of devices supporting air bags. For example, the present invention can be applied to a vehicle that does not include bend straps on the steering column.

Figure 5:
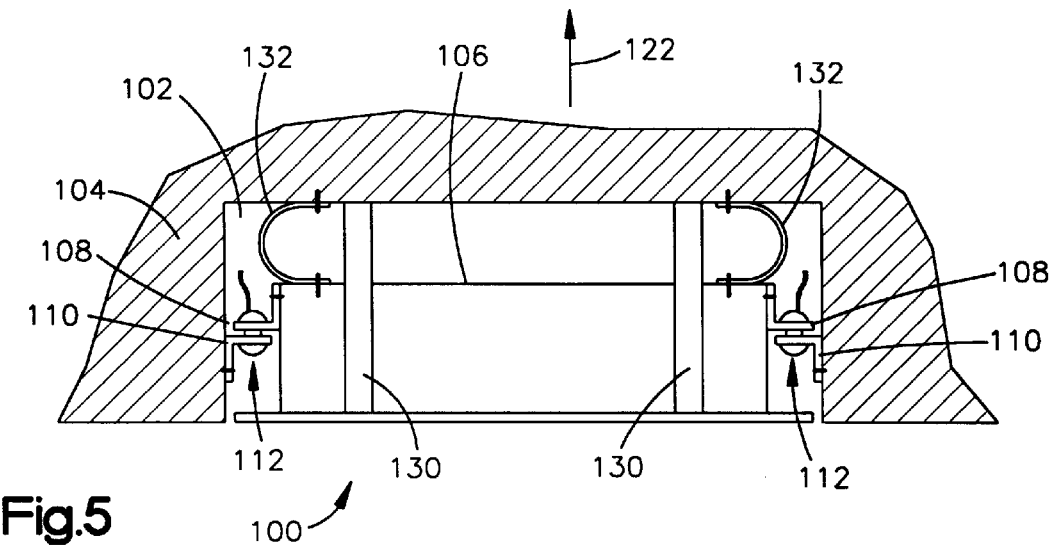
FIG. 5 is schematic view of a passenger side air bag module and support structure including actuatable fasteners shown in an unactuated condition.
Figure 6:
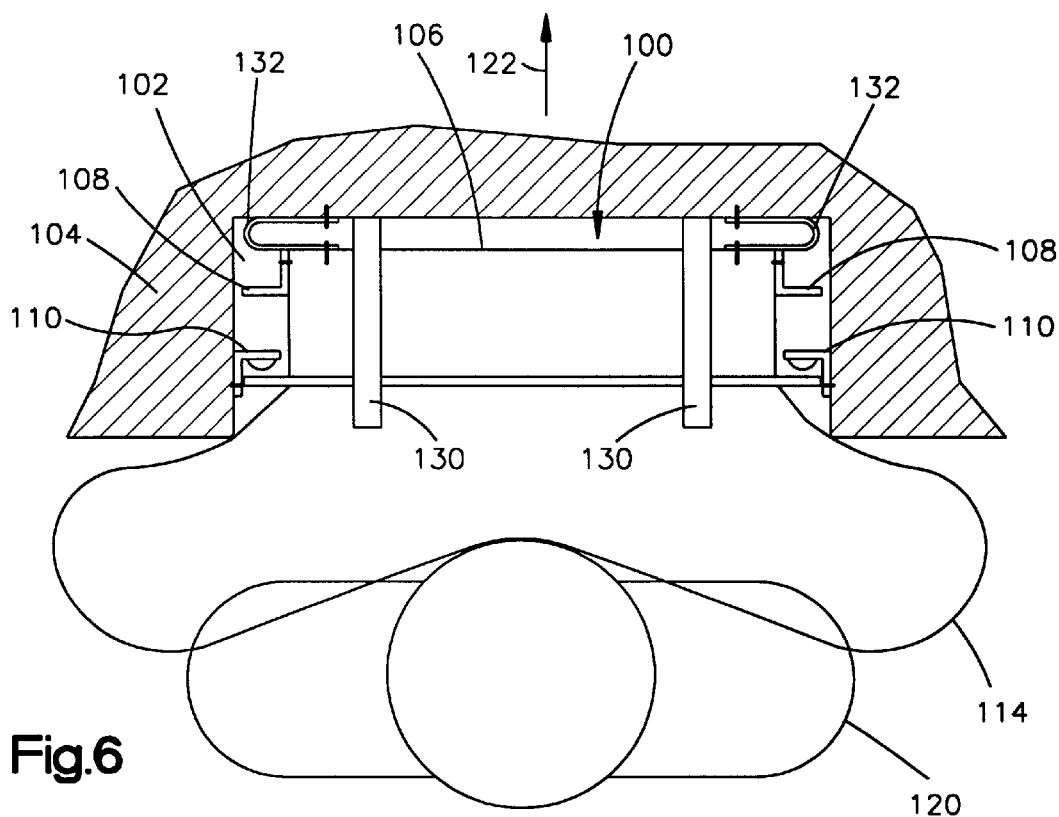
FIG. 6 is a view similar to FIG. 5 showing the passenger side air bag module fasteners in an actuated condition.

The present invention can also be applied to inflatable devices mounted in other parts of the vehicle, such as the instrument panel, door, side panels, or roof. FIGS. 5 and 6 illustrate a passenger side air bag module 100 mounted in an opening 102 in a vehicle instrument panel 104. The module 100 includes a housing 106 and an inflatable air bag 114.

Two first brackets 108 are fixed to the housing 106. Two second brackets 110 are fixed to the instrument panel 104. Two actuatable fasteners 112, preferably of the same type as illustrated in FIGS. 2–4, interconnect the first brackets 108 and the second brackets 110.

Upon the occurrence of a vehicle event for which protection of a passenger 120 is desired, the air bag 114 is inflated, as shown in FIG. 6, into a position between the passenger and the vehicle instrument panel 104. As the air bag 114 inflates and the passenger 120 moves forward in the vehicle, the passenger contacts the inflating air bag (FIG. 6). The force of the passenger's forward movement is transmitted into the air bag 114 and thereby into the housing 106.

The vehicle ECU (not shown) during this time period also determines whether to actuate the pyrotechnic rivets 112. Actuating the rivets 112 releases the housing 106 for forward movement in the vehicle, under the load applied by the vehicle passenger 120, to limit the maximum effective load on the passenger. If the pyrotechnic rivets 112 are actuated and fracture, then the first brackets 108, the housing 106, and the air bag 114 are released for movement in a forward direction 122 in the vehicle. The housing 106 moves forward in the vehicle relative to the instrument panel 104. The forward movement of the housing 106 causes the air bag 114 also to move in the forward direction 122 in the vehicle. One or more guide structures indicated schematically at 130 guide the forward movement of the housing 106 relative to the instrument panel 104. One or more bend straps 132 resist and control such forward movement of the housing 106.

When the air bag 114 moves forward, it presents less resistance to forward movement of the passenger 120, and so the maximum effective load on the passenger is limited. This can help to reduce injury to the passenger 120.

From the above description of the invention, those skilled in the art will perceive improvements, changes and modifications in the invention. For example, the actuatable fastener could be another type of fastener other than a pyrotechnic fastener, such as a solenoid device, an electromagnet device, a device incorporating a mechanical inertia sensor, or the like. Such improvements, changes and modifications within the skill of the art are intended to be covered by the appended claims.

Having described the invention, we claim:

1. A vehicle safety apparatus comprising:
   a vehicle steering column connected to a vehicle steering wheel to turn rotatable steerable vehicle wheels,
   a module operatively associated with said steering wheel and having an inflatable device for helping to protect an occupant of a vehicle and an inflator connected with said inflatable device to provide inflation fluid for inflating said inflatable device, and
   at least one actuatable fastener connected between said steering column and a vehicle part, said actuatable fastener having an unactuated condition blocking movement of said steering column in a forward direction in the vehicle relative to the vehicle part,
   said actuatable fastener having an actuated condition releasing said steering column for movement in the forward direction in the vehicle relative to the vehicle part under load applied to said inflatable device by the vehicle occupant, said forward movement of said steering column enabling forward movement of said inflatable device.

2. An apparatus as set forth in claim 1 wherein said actuatable fastener is a pyrotechnic fastener.

3. An apparatus as set forth in claim 1 further comprising:
   at least one sensor for sensing at least one vehicle condition or occupant condition relevant to a determination of whether or when to actuate said actuatable fastener; and
   vehicle electric circuitry responsive to said at least one sensor for determining whether or when to actuate said actuatable fastener and for sending an actuation signal to said actuatable fastener.

4. An apparatus as set forth in claim 3 wherein said sensed vehicle condition is crash severity, and said vehicle electric circuitry determines when to actuate said actuatable fastener based on sensed crash severity.

5. An apparatus as set forth in claim 3 wherein said vehicle electric circuitry determines when to actuate said fastener based on multiple occupant condition inputs.

6. An apparatus as set forth in claim 3 wherein the vehicle electric circuitry is programmed to actuate said actuatable fastener, depending on said at least one sensed condition, either simultaneously with deployment of said inflatable device or after deployment of said inflatable device or not at all.

7. An apparatus as set forth in claim 3 wherein said sensor senses at least one of occupant seat belt usage, size, weight, and position.

8. An apparatus as set forth in claim 1 including structure supporting said inflatable device for movement only in a generally forward direction in the vehicle.

9. An apparatus as set forth in claim 1 wherein said inflatable device is mounted on said vehicle steering column and said vehicle part is a steering column support bracket.

10. An apparatus as set forth in claim 9 further comprising a bend strap connected with said steering column for controlling movement of said steering column.

11. An apparatus as set forth in claim 1 wherein said actuatable fastener is a pyrotechnic rivet.

12. A vehicle safety apparatus comprising:
   a vehicle steering column connected to a vehicle steering wheel to turn rotatable steerable vehicle wheels;
   an inflatable device having a folded, uninflated condition and an unfolded, inflated condition for helping to protect an occupant of a vehicle;
   a vehicle part spaced apart from the vehicle steering wheel;
   a housing mounted to said vehicle part and containing said inflatable device, and
   at least one actuatable fastener for fastening said housing to said vehicle part, said actuatable fastener having an unactuated condition securing said housing to said vehicle part and blocking movement of said housing in a forward direction in the vehicle relative to the vehicle part, said actuatable fastener comprising a pyrotechnic rivet;
   said actuatable fastener having an actuated condition releasing said housing for movement in the forward direction in the vehicle relative to the vehicle part under load applied to said inflatable device by the vehicle occupant, said forward movement of said housing enabling forward movement of said inflatable device.

13. An apparatus as set forth in claim 12 further comprising:
   at least one sensor for sensing at least one vehicle condition or occupant condition relevant to a determination of whether or when to actuate said actuatable fastener; and
   vehicle electric circuitry responsive to said at least one sensor for determining whether or when to actuate said actuatable fastener and for sending an actuation signal to said actuatable fastener.

14. An apparatus as set forth in claim 13 wherein said sensed vehicle condition is crash severity, and said vehicle electric circuitry determines when to actuate said actuatable fastener based on sensed crash severity.

15. An apparatus as set forth in claim 13 wherein said vehicle electric circuitry determines when to actuate said fastener based on multiple occupant condition inputs.

16. An apparatus as set forth in claim 13 wherein the vehicle electric circuitry is programmed to actuate said actuatable fastener, depending on said at least one sensed condition, either simultaneously with deployment of said inflatable device or after deployment of said inflatable device or not at all.

17. An apparatus as set forth in claim 13 wherein said sensor senses at least one of occupant seat belt usage, size, weight, and position.

18. An apparatus as set forth in claim 12 including structure supporting said inflatable device for movement only in a generally forward direction in the vehicle.

19. An apparatus as set forth in claim 12 further comprising a bend strap connected with said housing for controlling movement of said housing.

20. An apparatus as set forth in claim 12 wherein said inflatable device is mounted on a passenger side module and said vehicle part is a vehicle instrument panel.

21. A vehicle safety apparatus comprising:

a vehicle steering column connected to a vehicle steering wheel to turn rotatable steerable vehicle wheels;

an inflatable device having a folded, uninflated condition and an unfolded, inflated condition for helping to protect an occupant of a vehicle;

a vehicle part spaced apart from the vehicle steering wheel;

a housing mounted to said vehicle part and containing said inflatable device;

at least one actuatable fastener for fastening said housing to said vehicle part, said actuatable fastener having an unactuated condition securing said housing to said vehicle part and blocking movement of said housing in a forward direction in the vehicle relative to the vehicle part, said actuatable fastener having an actuated condition releasing said housing for movement in the forward direction in the vehicle relative to the vehicle part under load applied to said inflatable device by the vehicle occupant, said forward movement of said housing enabling forward movement of said inflatable device; and a bend strap connected with said housing for controlling forward movement of said housing.

* * * * *